US012249235B2

(12) United States Patent
Kashimura et al.

(10) Patent No.: US 12,249,235 B2
(45) Date of Patent: Mar. 11, 2025

(54) INFORMATION PROCESSING DEVICE THAT ACQUIRES A ROTATIONAL ANGLE OF A HEAD OF A USER, METHOD THAT ACQUIRES A ROTATIONAL ANGLE OF A HEAD OF A USER, AND STORAGE MEDIUM THAT ACQUIRES A ROTATIONAL ANGLE OF A HEAD OF A USER

(71) Applicant: TOYOTA JIDOSHA KABUSHIKI KAISHA, Toyota Aichi-ken (JP)

(72) Inventors: Takashi Kashimura, Nagoya Aichi-ken (JP); Takahiro Kato, Numazu Shizuoka-ken (JP); Kazuyuki Yokota, Toyota Aichi-ken (JP)

(73) Assignee: TOYOTA JIDOSHA KABUSHIKI KAISHA, Toyota Aichi-ken (JP)

( * ) Notice: Subject to any disclaimer, the term of this patent is extended or adjusted under 35 U.S.C. 154(b) by 11 days.

(21) Appl. No.: 18/234,968

(22) Filed: Aug. 17, 2023

(65) Prior Publication Data

US 2024/0071208 A1 Feb. 29, 2024

(30) Foreign Application Priority Data

Aug. 25, 2022 (JP) ................................ 2022-134483

(51) Int. Cl.
*G08G 1/005* (2006.01)

(52) U.S. Cl.
CPC ................................... *G08G 1/005* (2013.01)

(58) Field of Classification Search
None
See application file for complete search history.

(56) References Cited

U.S. PATENT DOCUMENTS

2006/0165259 A1* 7/2006 Ogawa .................. G08G 1/163
382/104

FOREIGN PATENT DOCUMENTS

| | | | |
|---|---|---|---|
| JP | 2008-217113 | A | 9/2008 |
| JP | 2012-002950 | A | 1/2012 |
| JP | 2013-239191 | A | 11/2013 |
| JP | 2014-120114 | A | 6/2014 |
| JP | 2020-166507 | A | 10/2020 |
| WO | 2019/240062 | A1 | 12/2019 |
| WO | 2019/240065 | A1 | 12/2019 |
| WO | 2019/240070 | A1 | 12/2019 |

OTHER PUBLICATIONS

Japanese Office Action dated Nov. 26, 2024, issued to Corresponding Japanese Patent Application No. 2022-134483.

(Continued)

*Primary Examiner* — John F Mortell
(74) *Attorney, Agent, or Firm* — Dinsmore & Shohl LLP

(57) ABSTRACT

An information processing device includes a memory and a processor coupled to the memory and being configured to: acquire a rotation angle by which a head of a user has rotated and a maintained time during which the rotation angle has been maintained, and in a case in which the rotation angle is less than a preset angle, or in a case in which the rotation angle is equal to or greater than the preset angle and the maintained time is less than a preset time, cause a notification unit to execute notification corresponding to the rotation angle and the maintained time.

5 Claims, 8 Drawing Sheets

(56) References Cited

OTHER PUBLICATIONS

Hamaoka, Hidekatsu, “Research on the Safety Support Concerning Pedestrians Crossing the Intersection,” Takata Foundation [online], URL: https://www.takatafound.or.jp/support/articles/pdf/120927_08.pdf, Aug. 2012, pp. 40-51.

* cited by examiner

FIG.3

| | USER AGE | | | | |
|---|---|---|---|---|---|
| | LESS THAN 6 YRS OLD | 6 YRS OLD TO LESS THAN 8 YRS OLD | 8 YRS OLD TO LESS THAN 10 YRS OLD | 10 YRS OLD TO LESS THAN 12 YRS OLD | AT LEAST 12 YRS OLD |
| ANGLE A (° ) | 35 | 30 | 25 | 20 | 15 |
| TIME T (SEC) | 5 | 4 | 3 | 2 | 1 |

FIG.4

| | CROSSING ROADWAY | NOT CROSSING ROADWAY |
|---|---|---|
| ANGLE A (°) | 40 | 10 |
| TIME T (SEC) | 2 | 5 |

INFORMATION PROCESSING DEVICE THAT ACQUIRES A ROTATIONAL ANGLE OF A HEAD OF A USER, METHOD THAT ACQUIRES A ROTATIONAL ANGLE OF A HEAD OF A USER, AND STORAGE MEDIUM THAT ACQUIRES A ROTATIONAL ANGLE OF A HEAD OF A USER

CROSS-REFERENCE TO RELATED APPLICATION

This application is based on and claims priority under 35 USC 119 from Japanese Patent Application No. 2022-134483 filed on Aug. 25, 2022, the disclosure of which is incorporated by reference herein.

BACKGROUND

Technical Field

The present disclosure relates to an information processing device, a method, and a non-transitory storage medium.

Related Art

Japanese Patent Application Laid-open (JP-A) No. 2012-002950 discloses a walking environment simulator including a head measuring means for measuring movement of a head of a subject, and a computer. The head measuring means detects the position and rotation angle of a sensor attached to the head of the subject, and outputs the detected position and rotation angle to the computer. Moreover, the computer includes means to create an illustrative image showing the orientation of the face in accordance with the rotation angle of the head of the subject during a right-and-left checking action prior to traversing a roadway, and to visualize the right-and-left checking action.

In the walking environment simulator disclosed in JP-A No. 2012-002950, only the angle of rotation of the head is considered when visualizing right and left checking actions prior to traversing the roadway, and the time required to determine whether or not it is possible to traverse a roadway is not considered.

SUMMARY

The present disclosure has been made in consideration of the foregoing circumstances, and provides an information processing device, a method, and a non-transitory storage medium that enable the safety of a user to be further ensured in comparison to cases in which the time for which a rotation angle of a head of a user is maintained, is not considered.

A first aspect of the present disclosure is an information processing device, including: a memory; and a processor coupled to the memory and being configured to: acquire a rotation angle by which a head of a user has rotated and a maintained time during which the rotation angle has been maintained, and in a case in which the rotation angle is less than a preset angle, or in a case in which the rotation angle is equal to or greater than the preset angle and the maintained time is less than a preset time, cause a notification unit to execute notification corresponding to the rotation angle and the maintained time.

In the information processing device of the present aspect, the processor acquires the rotation angle by which the user's head has rotated, and also acquires the maintained time during which the rotation angle has been maintained, and in cases in which the rotation angle is less than a preset angle, or in cases in which the rotation angle is not less than the preset angle and the maintained time is less than a preset time, the notification unit is caused to execute notification corresponding to the rotation angle and the maintained time. In the present aspect, compared to cases in which the time during which the rotation angle of the user's head is maintained is not considered, the safety of the user may be further ensured.

A second aspect of the present disclosure is an information processing device, including: a memory; and a processor that is coupled to the memory and being configured to: acquire a rotation angle by which a head of a user has rotated and a maintained time during which the rotation angle has been maintained, and in a case in which the rotation angle is equal to or greater than a preset angle and the maintained time is equal to or greater than a preset time, cause a notification unit to execute notification.

A third aspect of the present disclosure is, in the first or second aspect, the processor is configured to cause the notification unit to execute the notification based on a preset angle and a preset time that are set based on the age of the user. According to the third aspect, the safety of the user may be further ensured in comparison to cases in which the age of the user is not considered.

A fourth aspect of the present disclosure is, n the third aspect, the processor is configured to cause the notification unit to execute the notification with the preset angle being a larger angle and the preset time being a longer time for a lower age. The fourth aspect enables the safety of users with relatively low ages to be further ensured.

A fifth aspect of the present disclosure is, in the first to fourth aspects, the processor is configured acquire the current position of the user, and cause the notification unit to execute the notification based on a preset angle and a preset time that are set based on whether or not the user is crossing a roadway. The fifth aspect enables the safety of the user to be further ensured in comparison to cases in which the movement of the head required to check a vehicle coming from a blind spot during crossing of a roadway is not considered.

A sixth aspect of the present disclosure is, in the fifth aspect, in a case in which the user is crossing a roadway, the processor is configured to cause the notification unit to execute the notification with a larger angle as the preset angle and with a shorter time as the preset time as compared to a case in which the user is not crossing a roadway. The sixth aspect enables the risk of a user encountering an accident while crossing a roadway to be further reduced.

A seventh aspect of the present disclosure is an information processing method including: acquiring a rotation angle by which a head of a user has rotated and a maintained time during which the rotation angle has been maintained, and in a case in which the rotation angle is less than a preset angle, or in a case in which the rotation angle is equal to or greater than the preset angle and the maintained time is less than a preset time, causing a notification unit to execute notification corresponding to the rotation angle and the maintained time.

A eighth aspect of the present disclosure is a non-transitory storage medium storing a program executable by a computer to perform information processing, the information processing including: acquiring a rotation angle by which a head of a user has rotated and a maintained time during which the rotation angle has been maintained, and in a case in which the rotation angle is less than a preset angle, or in a case in which the rotation angle is equal to or greater than the preset angle and the maintained time is less than a preset time, causing a notification unit to execute notification corresponding to the rotation angle and the maintained time.

According to the present disclosure, the safety of the user may be further ensured in comparison to cases in which the time during which the rotation angle of the user's head is maintained is not considered.

BRIEF DESCRIPTION OF THE DRAWINGS

FIG. 3 is a schematic diagram illustrating an example of a configuration of an age database according to the present exemplary embodiment.

FIG. 4 is a schematic diagram illustrating an example of a configuration of a traversal database according to the present exemplary embodiment.

DETAILED DESCRIPTION

Figure 1:
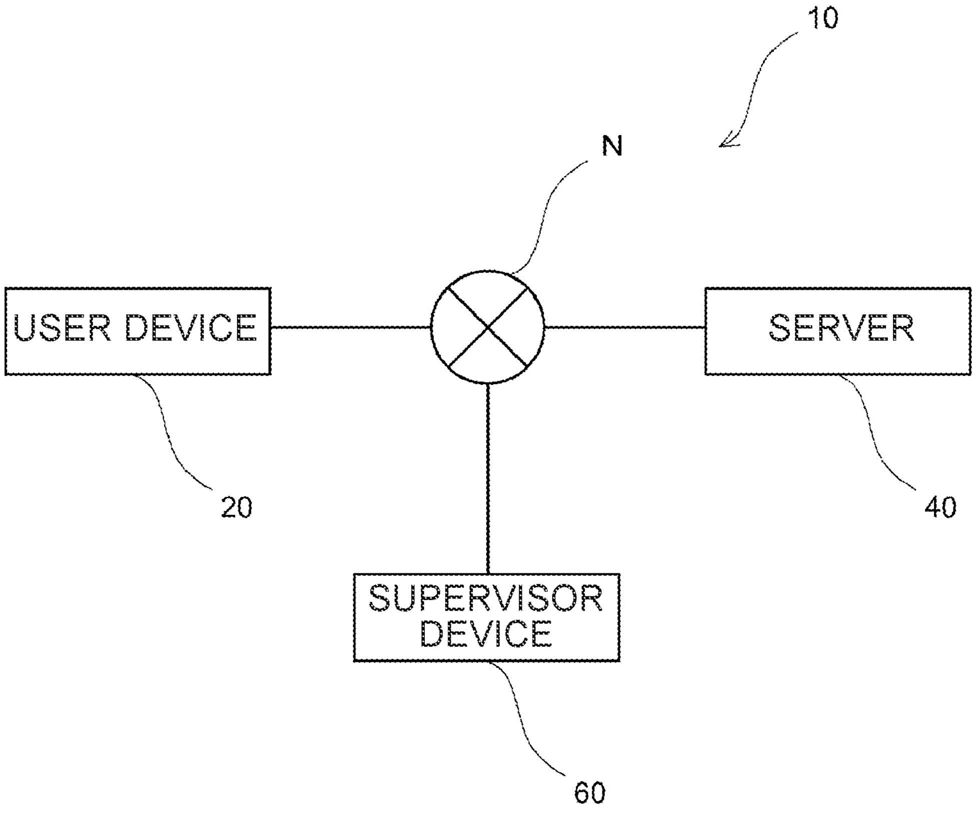
FIG. 1 is a diagram illustrating a schematic configuration of an information processing system according to the present exemplary embodiment.

FIG. 1 is a diagram illustrating a schematic configuration of an information processing system 10. As illustrated in FIG. 1, the information processing system 10 includes a user device 20, a server 40, and a supervisor device 60. The user device 20, the server 40, and the supervisor device 60 are connected through a network N so as to be capable of communicating with each other.

The user device 20 is a device carried by a user. In the present exemplary embodiment, as an example, the user is a "child". As an example, the user device 20 is worn on a user's head. The user device 20 is an example of an "information processing device".

The server 40 is a server computer held by a predetermined business operator. The supervisor device 60 is a device held by a parent, who is the user's supervisor. As an example, the supervisor device 60 is a general-purpose computer device such as a personal computer (PC), or a portable device such as a portable notebook PC, smart phone, or tablet terminal. In the present exemplary embodiment, as an example, the supervisor device 60 is a smart phone.

Figure 2:
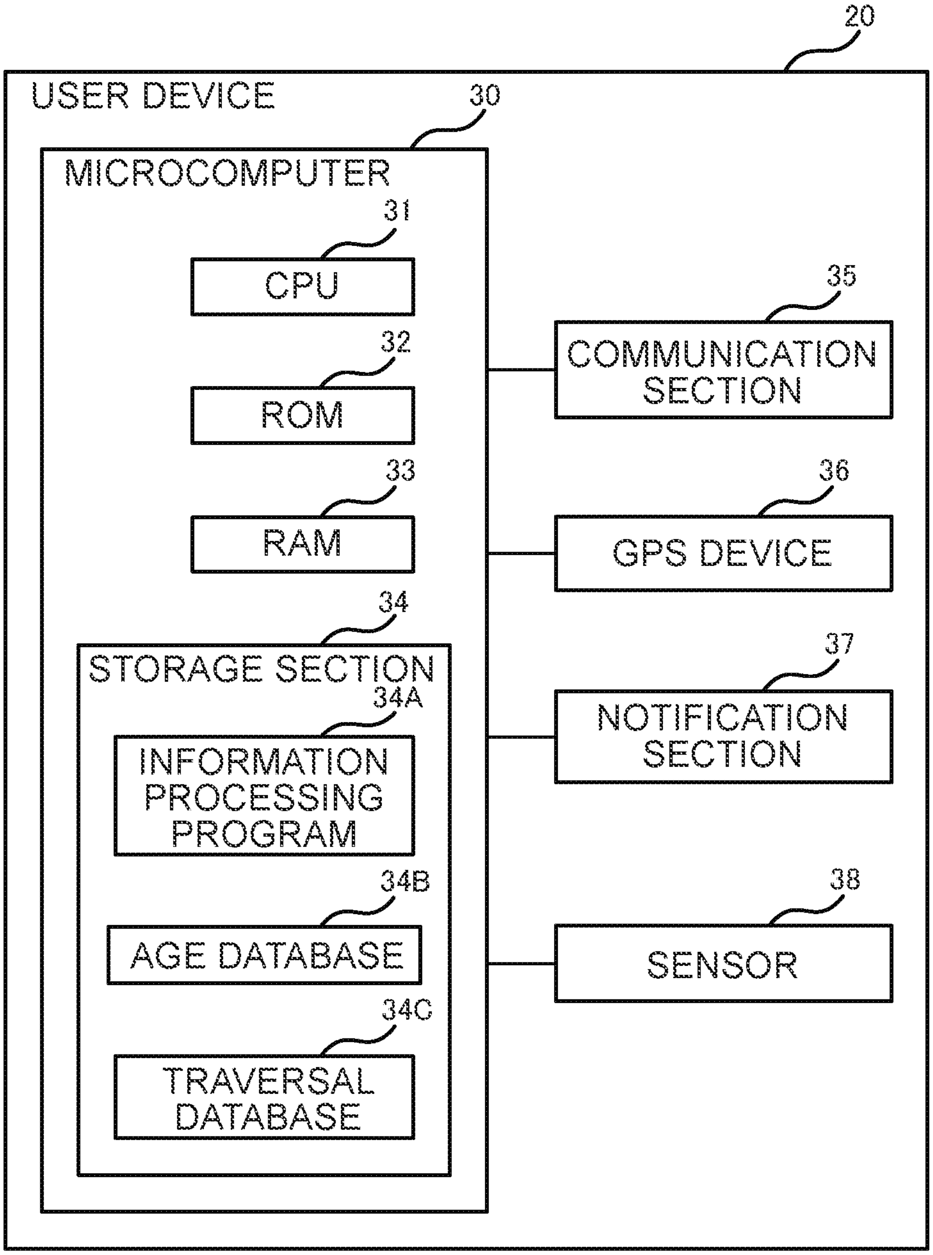
FIG. 2 is a block diagram illustrating a hardware configuration of a user device according to the present exemplary embodiment.

Next, explanation follows regarding the hardware configuration of the user device 20. FIG. 2 is a block diagram illustrating the hardware configuration of the user device 20. As illustrated in FIG. 2, the user device 20 includes a microcomputer 30, a communication section 35, a GPS device 36, a notification section 37, and a sensor 38.

The microcomputer 30 includes a central processing unit (CPU) 31, read only memory (ROM) 32, random access memory (RAM) 33, and a storage section 34.

The CPU 31 is a central processing unit that executes various programs and controls various sections. Namely, the CPU 31 reads a program from the ROM 32 or the storage section 34, and executes the program using the RAM 33 as a workspace. The CPU 31 controls the respective configurations and performs various computation processing according to a program stored in the ROM 32 or the storage section 34.

The ROM 32 stores various programs and various data. The RAM 33 serves as a workspace to temporarily store programs and data.

The storage section 34 is configured by a storage device such as an embedded multi media card (eMMC) or universal flash storage (UFS), and stores various programs and various data. As an example of various programs, the storage section 34 stores an information processing program 34A for causing the CPU 31 to function as the functional configuration illustrated in FIG. 5, described below. As an example of various data, the storage section 34 stores range information transmitted from the server 40 and indicating a range on a school route for prompting a user to take safety actions. Details of the range information are described later. The storage section 34 also stores an age database 34B and a cross-sectional database 34C.

FIG. 3 is a schematic diagram illustrating an example of a configuration of the age database 34B.

As illustrated in FIG. 3, the angle A and the time T are stored in the age database 34B in a correlated manner for each age of the users grouped in a predetermined range. As illustrated in FIG. 3, the younger the user is, the larger the angle A that is stored, and the longer the time T that is stored.

FIG. 4 is a schematic diagram illustrating an example of a configuration of the traversal database 34C.

As illustrated in FIG. 4, the traversal database 34C stores different angles A and times T based on whether or not a user is traversing the roadway. As illustrated in FIG. 4, in a case in which the user is traversing the roadway, a larger angle is stored as the angle A and a shorter time is stored as the time T in comparison to a case in which the user is not traversing the roadway.

The communication section 35 is a wireless communication module for communicating with the server 40 and the supervisor device 60. For example, a communication standard such as 5G, LTE, or Wi-Fi® is used as the wireless communication module. The communication section 35 is connected to the network N.

The GPS device 36 is a device that measures a current position of a user. The GPS device 36 includes a non-illustrated antenna that receives signals from GPS satellites. The current position of the user measured by the GPS device 36 is stored in the storage section 34 in association with the measurement date and time at which the current position was measured, and is also transmitted to the server 40.

The notification section 37 is a device that executes plural notifications to prompt a user traveling on a school route to take safety actions. As an example, the notification section 37 executes the above notifications using sound. Moreover, plural types of sound notification patterns are provided by the notification section 37, and the notification section 37 executes notification using a notification pattern according to an instruction from the CPU 31.

The sensor 38 is a device that detects movement of a user's head as a physical quantity and converts the physical quantity into data. As an example, the sensor 38 includes an angular velocity sensor that detects an angular velocity of a rotation angle at which a user's head has rotated, an acceleration sensor that detects acceleration when the user's head has rotated, a geomagnetic sensor that detects a geomagnetic value, and the like.

Figure 5:
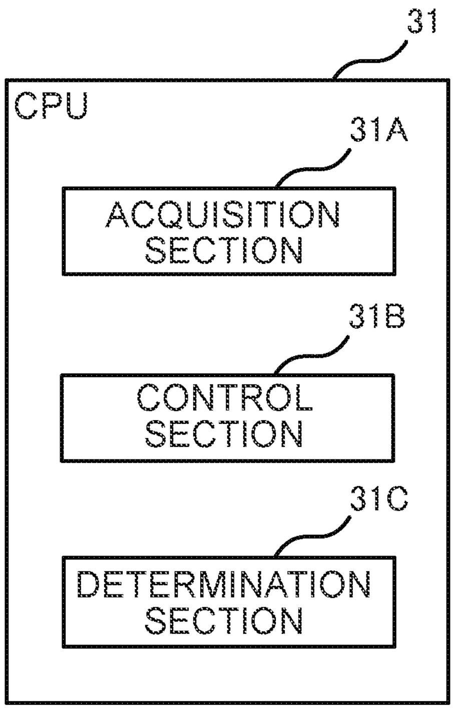
FIG. 5 is a block diagram illustrating an example of functional configuration of a user device according to the present exemplary embodiment.

Next, explanation follows regarding the functional configuration of the user device 20. FIG. 5 is a block diagram illustrating an example of the functional configuration of the user device 20.

As illustrated in FIG. 5, the CPU 31 of the user device 20 includes an acquisition section 31A, a control section 31B, and a determination section 31C as functional configuration. The respective functional configuration is implemented by the CPU 31 reading and executing the information processing program 34A stored in the storage section 34.

The acquisition section 31A has a function of acquiring a rotation angle by which the head of the user has rotated, and a maintained time during which the rotation angle has been maintained. More specifically, the acquisition section 31A acquires the rotation angle and the maintained time via the sensor 38 in a case in which the travel direction of the user is set to 0 degrees. Moreover, the acquisition section 31A acquires the current position of the user via the GPS device 36.

Moreover, the acquisition section 31A acquires from the server 40 range information indicating a range on the school route in which the user is prompted to take safety actions. Examples of safety actions include checking actions to check traffic safety and evacuation actions to evacuate from a current location. Examples of ranges on school routes that encourage safety actions include a checking range that encourages checking actions and an evacuation range that encourages evacuation actions.

Note that the acquisition section 31A acquires, as the range information, position information indicating either one of the checking range or the evacuation range described above. As an example, the acquisition section 31A acquires, as the range information, location information that indicates a checking range in which a traffic accident has arisen in the past, position information that indicates an evacuation range in which a suspicious individual has been witnessed in the past, location information indicating evacuation areas with high risk of natural disasters such as landslides or tsunamis, and position information indicating the checking range or evacuation range designated by the user's supervisor, and the like.

In a case in which the rotation angle is less than a preset angle or in a case in which the rotation angle is greater than or equal to the preset angle and the maintained time is less than a preset time, the control section 31B has a function of causing the notification section 37 to provide a notification according to the rotation angle and the maintained time. Further, in a case in which the rotation angle is greater than or equal to the preset angle and the maintained time is equal to or greater than the preset time, the control section 31B causes the notification section 37 to provide a notification. Hereinafter, the preset angle is referred to as the angle A, and the preset time is referred to as the time T.

More specifically, in a case in which the rotation angle is less than the angle A, the control section 31B causes the notification section 37 to execute a notification urging the user to more carefully check the right and left sides. Moreover, in a case in which the rotation angle is equal to or more than the angle A and the maintained time is less than the time T, the control section 31B causes the notification section 37 to execute a notification urging the user to check the right and left sides at a lower speed. In a case in which the rotation angle is equal to or greater than the angle A and the maintained time is equal to or greater than the time T, the notification section 37 is caused to execute a notification praising the user.

The determination section 31C has a function of setting the angle A and the time T. In the present exemplary embodiment, the determination section 31C reads the age database 34B, and sets the angle A and the time T based on the age of the user. The age database 34B holds a larger angle as the angle A and a longer time as the time T as the age of the user decreases. Accordingly, the determination section 31C sets the angle A to a larger angle and sets the time T to a longer time as the age of the user is lower. However, the embodiment is not limited to this example. For example, in a case in which the user is an "elderly person", the determination section 31C may set the angle A to a larger angle and set the time T to a longer time the older the user.

Note that the determination section 31C may read the traversal database 34C, and set the angle A and the time T based on whether or not the user is traversing a roadway. In the present exemplary embodiment, the determination section 31C determines that the user is crossing the roadway in a case in which the current position is a roadway, and determines that the user is not crossing the roadway in a case in which the current position is a sidewalk. The traversal database 34C stores a larger angle as the angle A and a shorter time as the time T in a case in which the user is traversing the roadway than in a case in which the user is not traversing the roadway. Accordingly, in a case in which the user is traversing the roadway, the determination section 31C sets the angle A to a larger angle and sets the time T to a shorter time than in a case in which the user is not traversing the roadway. However, the embodiment is not limited to this example. The determination section 31C may set the angle A to a smaller angle and set the time T to a longer time in a case in which the user is traversing the roadway than in a case in which the user is not traversing the roadway.

Figure 6:
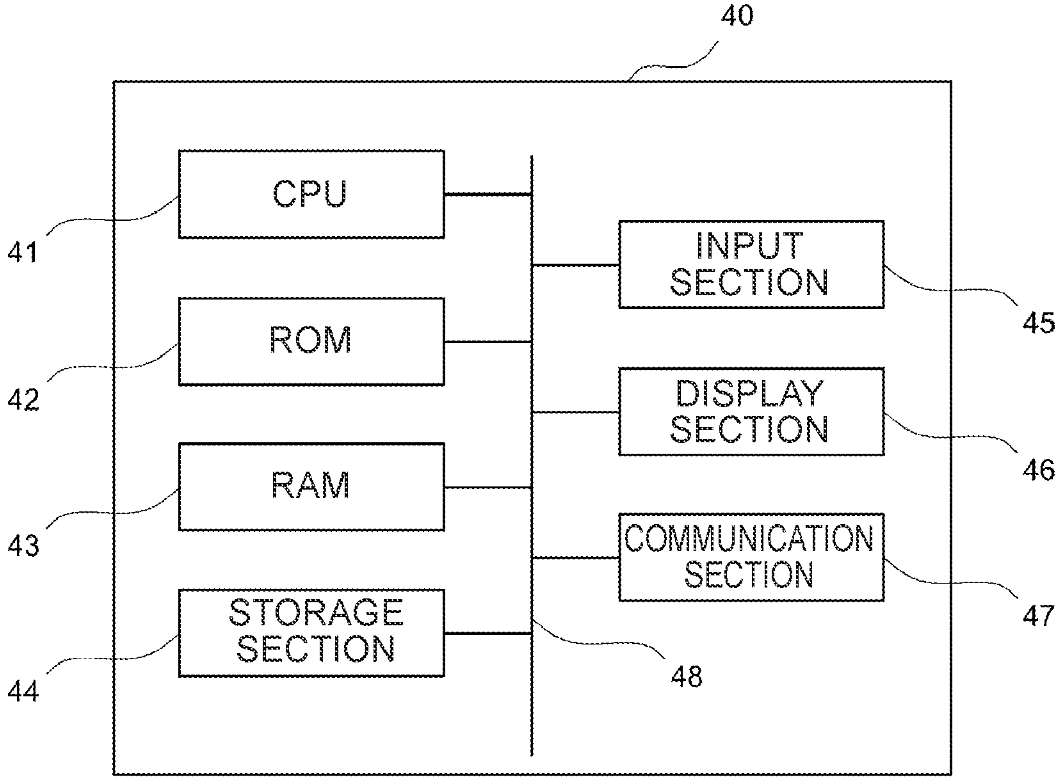
FIG. 6 is a block diagram illustrating a hardware configuration of a server according to the present exemplary embodiment.

Next, explanation follows regarding a hardware configuration of the server 40. FIG. 6 is a block diagram illustrating a hardware configuration of the server 40.

As illustrated in FIG. 6, the server 40 includes a CPU 41, a ROM 42, a RAM 43, a storage section 44, an input section 45, a display section 46, and a communication section 47. These configurations are connected together through a bus 48 so as to be capable of communicating with each other. The functionality of the CPU 41, the ROM 42, and the RAM 43 is the same as the functionality of the CPU 31, the ROM 32, and the RAM 33 included in the user device 20, and therefore explanation thereof is omitted.

The storage section 44 is configured by a storage device such as a hard disk drive (HDD), a solid state drive (SSD), or flash memory, and stores various programs and various data.

The input section 45 includes a pointing device such as a mouse, a keyboard, a microphone, a camera, and the like, and is used to perform various inputs.

The display section 46 is, for example, a liquid crystal display, and displays various information. The display section 46 may employ a touch panel method to function as the input section 45.

The communication section 47 is an interface for communicating with the user device 20 and the supervisor device 60. For example, a wired communication standard such as Ethernet® or Fiber distributed data interface (FDDI), or a wireless communication standard such as 4G, 5G, Bluetooth®, or Wi-Fi® is used for this communication. The communication section 47 is connected to the network N.

Note that the CPU 41 of the server 40 periodically acquires position information indicating respective ranges on the school route from a non-illustrated external device for the checking range of past traffic accidents, the evacuation range in which suspicious persons were witnessed in the past, and the evacuation range with high risk of natural disasters. Moreover, the CPU 41 acquires from the supervisor device 60 position information indicating the respective ranges of the checking range and the evacuation range specified by the user's supervisor on the school route. The CPU 41 stores the acquired position information in the storage section 44 as range information. The CPU 41 then periodically transmits the range information stored in the storage section 44 to the user device 20.

Moreover, the CPU 41 acquires the current position of the user and the measurement date and time of the current position from the user device 20. The CPU 41 stores the acquired current position of the user and the measurement date and time of the current position in the storage section 44. The CPU 41 then, using the current position of the user and the measurement date and time of the current position stored in the storage section 44, periodically generates a travel path of the user on the school route, and the generated travel path of the user is transmitted to the supervisor device 60.

Figure 7:
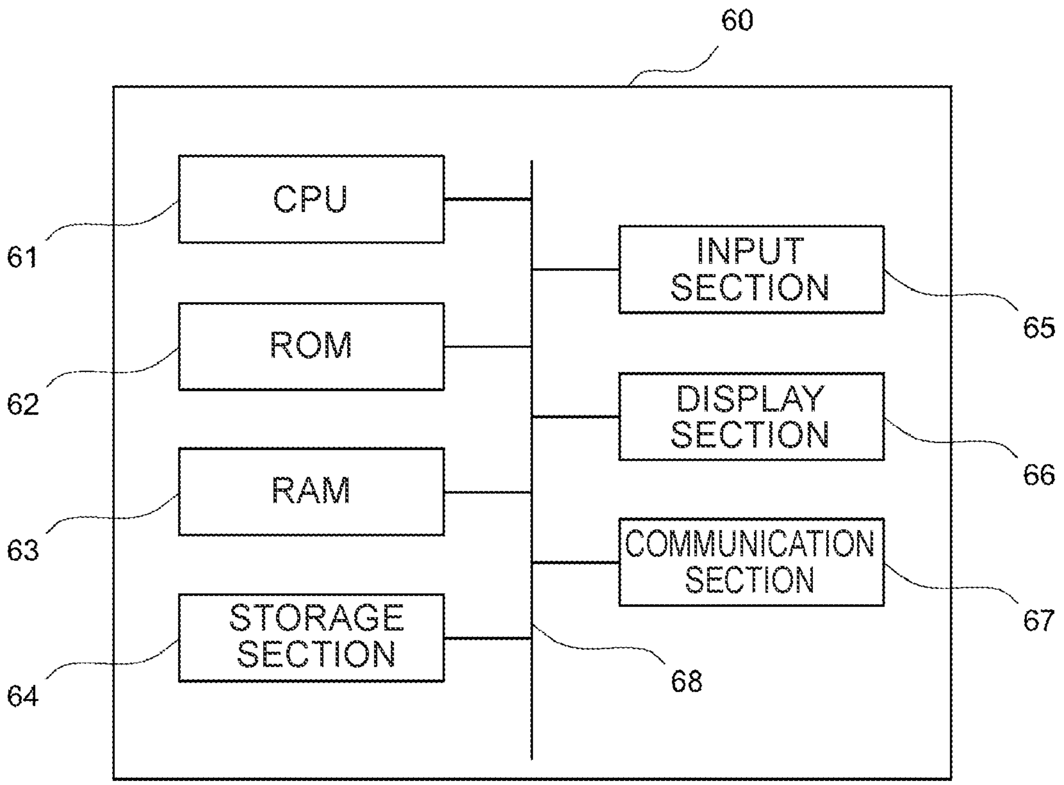
FIG. 7 is a block diagram illustrating a hardware configuration of a supervisor device according to the present exemplary embodiment.

Next, explanation follows regarding a hardware configuration of the supervisor device 60. FIG. 7 is a block diagram illustrating a hardware configuration of the supervisor device 60.

As illustrated in FIG. 7, the supervisor device 60 includes a CPU 61, a ROM 62, a RAM 63, a storage section 64, an input section 65, a display section 66, and a communication section 67. These configurations are connected together through a bus 68 so as to be capable of communicating with each other. Functions of the CPU 61, the ROM 62, the RAM 63, the storage section 64, and the communication section 67 are the same as the CPU 31, the ROM 32, the RAM 33, the storage section 34, and the communication section 35 included in the user device 20 and, therefore, explanation thereof is omitted. Since the functions of the input section 65 and the display section 66 are the same as those of the input section 45 and the display section 46 included in the server 40, explanation thereof is omitted.

The CPU 61 of the supervisor device 60 requests the travel path of the user on the school route from the server 40. The CPU 61 then displays the acquired travel path of the user on the display section 66.

Moreover, the CPU 61 receives designation of the checking range and the evacuation range on the school route by the supervisor. Then, the CPU 61 transmits position information indicating the checking range and the evacuation range for which the designation has been received to the server 40.

Figure 8:
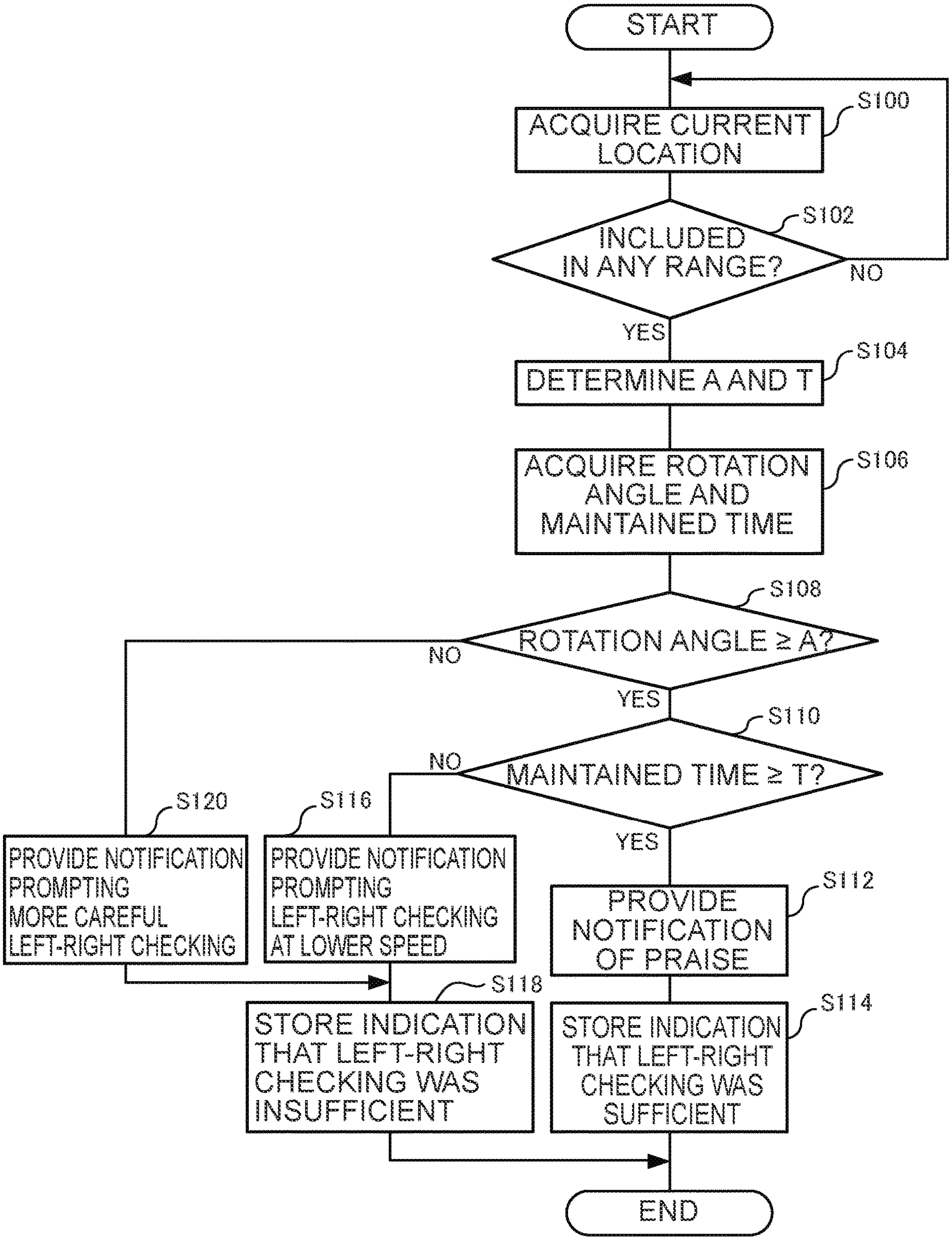
FIG. 8 is a flowchart illustrating a flow of information processing according to the present exemplary embodiment.

FIG. 8 is a flowchart illustrating a flow of information processing performed by the user device 20 to cause the notification section 37 to perform a notification according to the rotation angle and the maintained time. The CPU 31 reads the information processing program 34A from the storage section 34, loads the information processing program 34A in the RAM 33, and execute the information processing program 34A to perform information processing.

At step S100 in FIG. 8, the CPU 30A acquires the current location of the user from the GPS device 36.

At step S102, the CPU 31 determines whether or not the current location of the user acquired at step S100 is included in any range indicated by the range information acquired from the server 40. In a case in which the CPU 30A determines that the current location of the user is included in any range indicated by the range information acquired from the server 40 (step S102: YES), the processing proceeds to step S104. On the other hand, in a case in which the CPU 30A determines that the current position of the user is not included in any range indicated by the range information (step S102: NO), the processing returns to step S100.

At step S104, the CPU 30A determines the angle A and the time T. More specifically, the angle A and the time T associated with the age of the user are read from the age database 34B. Note that the CPU 30A may determine the angle A and the time T from the traversal database 34C based on whether or not the user is traversing the roadway.

At step S106, the CPU 30A acquires the rotation angle and the maintained time via the sensor 38 in a case in which the travel direction of the user is set to 0 degrees.

At step S108, the CPU 30A determines whether or not the rotation angle is equal to or greater than the angle A. In a case in which the rotation angle is equal to or greater than the angle A (step S108: YES), the processing transitions to step S110.

At step S110, the CPU 30A determines whether or not the maintained time is equal to or longer than time T. In a case in which the maintained time is equal to or longer than the time T (step S110: YES), the processing transitions to step S112.

At step S112, the CPU 30A causes the notification section 37 to execute a notification praising the user. More specifically, the CPU 30A causes the notification section 37 to execute notification using sound to which the message, "Well done", has been added.

At step S114, the CPU 30A stores in the storage section 34 an indication that the left-right checking is sufficient, and ends the present information processing.

On the other hand, in a case in which the maintained time is less than the time T (step S110: NO), the processing transitions to step S116. At step S116, the CPU 30A causes the notification section 37 to execute notification prompting the user to check the right and left sides at a lower speed. More specifically, the CPU 30A causes the notification section 37 to perform notification using sound to which the message, "Let's look left and right more slowly", has been added.

At step S118, the CPU 30A stores in the storage section 34 an indication that the left-right checking is inadequate, and ends the present information processing.

On the other hand, in a case in which the rotation angle is less than the angle A (step S108: NO), the processing transitions to step S120. At step S120, the CPU 30A causes the notification section 37 to execute a notification urging the user to check the right and left sides more carefully. More specifically, the CPU 30A causes the notification section 37 to perform notification using sound to which the message, "Let's look right and left carefully", has been added. Then, the processing transitions to step S118.

Notes

In the above exemplary embodiment, the CPU 31 sets the angle A and the time T based on the age of the user and whether or not the user is traversing the roadway. However, the embodiment is not limited to this example. The CPU 31 may set the angle A to a larger angle and set the time T to a longer time as the length of the roadway that the user is traversing is longer. Alternatively, the CPU 31 may set the angle A to a larger angle and set the time T to a longer time as the risk of any of the ranges indicated by the range information acquired from the server 40 included in the current location is higher. Alternatively, the CPU 31 may set the angle A to a larger angle and set the time T to a longer time as the number of times that left-right checking is insufficient stored in the storage section 34 is larger.

Although the user device 20 is an example of an information processing device in the above exemplary embodiment, there is no limitation thereto, and the server 40 may be an example of an information processing device, or a combination of the user device 20 and the server 40 may be an example of an information processing device. In a case in which a combination of the user device 20 and the server 40 serves as an information processing device, the information processing is executed by one processor of the CPU 31 of the user device 20 or the CPU 41 of the server 40, or by a combination of plural processors of the CPU 31 of the user device 20 and the CPU 41 of the server 40.

Although the parent is the supervisor of the user in the above exemplary embodiment, the supervisor of the user is not limited. For example, the user's supervisor may be another relative, such as a brother, sister, or grandparent, or may be other than a relative, such as an elementary school teacher or a school child care instructor.

Although the above exemplary embodiment illustrates an example of a school route on a road, the school route may be a school route between a school and a home, or may be a school route between a learning facility such as for exercise or a private tutoring school, and a home.

Although the notification section 37 has executed notification using sound in the above exemplary embodiment, there is no limitation thereto, and notification may be executed using vibration and sound. Moreover, in a case in which a monitor is provided in the user device 20, the notification section 37 may execute notification using the monitor in addition to sound. Alternatively, the CPU 31 may cause the notification section 37 to perform notification using sounds of different voices according to the rotation angle and the maintained time. Alternatively, the CPU 31 may cause the notification section 37 to perform notification using sound that has been used in cases in which the rotation angle and the maintained time have changed to the greatest extent.

Although in the above exemplary embodiment, the CPU 31 causes the notification section 37 to execute a notification in a case in which a user enters a range on a school route that encourages safety action, the notification timing by the notification section 37 is not limited to this. For example, the CPU 31 may perform control so as to cause the notification section 37 to execute notification in a case in which the distance between the current position of the user traveling on the school route and the boundary of the above range is equal to or less than a predetermined distance. This enables the user device 20 to prompt the user to take safety actions before the user enters the above range. Moreover, in cases in which the user has approached the range on the school route that encourages safety action, the CPU 31 may cause the notification section 37 to execute notification urging left and right checking before acquiring the rotation angle and the maintained time.

In the above exemplary embodiment, in a case in which the CPU 31 has detected a dangerous behavior of a user via the sensor 38, the CPU 31 may cause the notification section 37 to execute notification prompting the user to stop the dangerous behavior. As dangerous behavior in this case, behavior of running near the roadway, behavior of walking looking in a direction other than the travel direction, or the like may be applied.

Moreover, in the above exemplary embodiment, the CPU 31 may execute information processing only in a case in which the user is walking or riding on a bicycle.

In the above exemplary embodiment, whether or not a safety action has been performed by a user stored in the storage section 34 may be transmitted from the user device 20 to the server 40. The server 40 may periodically generate a travel path of a user in consideration of whether or not a safety action has been performed on the school route, and transmit the generated travel path of the user to the supervisor device 60.

Although the user device 20 acquires the range information from the server 40 in the above exemplary embodiment, in addition to this, the user device 20 may acquire the range information from the supervisor device 60.

In the above exemplary embodiment, the server 40 acquires, from an external device, position information indicating the checking range in which a traffic accident has arisen in the past on the school route, the evacuation range in which a suspicious individual has been witnessed in the past, and the like. At this time, a Data Communication Module (DCM) or the like included in a server computer, a vehicle, or the like held by a predetermined business entity may be applied as the external device. In a case in which the external device is a DCM, the DCM transmits vehicle travel data acquired from the DCM data to the server 40. The server 40 then extracts from the acquired vehicle travel data position information indicating a checking range in which a traffic accident has arisen in the past, a checking range in which dangerous driving (such as a stop violation or excessive speed) has arisen in the past, and the like. The extracted position information may be stored in the storage section 44 as the range information.

Note that the information processing executed by the CPU 31 reading and executing software (a program) in the above exemplary embodiments may be executed by various types of processor other than a CPU. Such processors include programmable logic devices (PLD) that allow circuit configuration to be modified post-manufacture, such as a field-programmable gate array (FPGA), and dedicated electric circuits, these being processors including a circuit configuration custom-designed to execute specific processing, such as an application specific integrated circuit (ASIC). The information processing may be executed by any one of these various types of processor, or by a combination of two or more of the same type or different types of processor (such as plural FPGAs, or a combination of a CPU and an FPGA). The hardware structure of these various types of processors is more specifically an electric circuit combining circuit elements such as semiconductor elements.

Although explanation has been given regarding an aspect in which the information processing program 34A is stored (installed) in advance in the storage section 34 in the above exemplary embodiment, there is no limitation thereto. The information processing program 34A may be provided in a format recorded on a recording medium such as compact disc read only memory (CD-ROM), digital versatile disc read only memory (DVD-ROM), or universal serial bus (USB) memory. Alternatively, the information processing program 34A may be provided in a format downloadable from an external device over the network N.

What is claimed is:

1. An information processing device, comprising:

a memory; and a processor that is coupled to the memory and being configured to:

acquire a rotation angle by which a head of a user has rotated and a maintained time during which the rotation angle has been maintained, in a case in which the rotation angle is less than a preset angle, or in a case in which the rotation angle is equal to or greater than the preset angle and the maintained time is less than a preset time, cause a notification unit to execute notification corresponding to the rotation angle and the maintained time, acquire a current location of the user, and cause the notification unit to execute the notification based on the preset angle and the preset time, which are set based on whether or not the user is crossing a roadway.

2. An information processing device, comprising:

a memory; and a processor that is coupled to the memory and being configured to:

acquire a rotation angle by which a head of a user has rotated and a maintained time during which the rotation angle has been maintained, in a case in which the rotation angle is equal to or greater than a preset angle and the maintained time is equal to or greater than a preset time, cause a notification unit to execute notification corresponding to the rotation angle and the maintained time, acquire a current location of the user, and cause the notification unit to execute the notification based on the preset angle and the preset time, which are set based on whether or not the user is crossing a roadway.

3. The information processing device recited in claim 1, wherein the processor is configured to, in a case in which the user is crossing a roadway, cause the notification unit to execute the notification with a larger angle as the preset angle and with a shorter time as the preset time as compared to a case in which the user is not crossing a roadway.

4. An information processing method, comprising:

acquiring a rotation angle by which a head of a user has rotated and a maintained time during which the rotation angle has been maintained;

in a case in which the rotation angle is less than a preset angle, or in a case in which the rotation angle is equal to or greater than the preset angle and the maintained time is less than a preset time, causing a notification unit to execute notification corresponding to the rotation angle and the maintained time;

acquire a current location of the user; and cause the notification unit to execute the notification based on the preset angle and the preset time, which are set based on whether or not the user is crossing a roadway.

5. A non-transitory storage medium storing a program executable by a computer to perform information processing, the information processing comprising:

acquiring a rotation angle by which a head of a user has rotated and a maintained time during which the rotation angle has been maintained;

in a case in which the rotation angle is less than a preset angle, or in a case in which the rotation angle is equal to or greater than the preset angle and the maintained time is less than a preset time, causing a notification unit to execute notification corresponding to the rotation angle and the maintained time;

acquire a current location of the user; and cause the notification unit to execute the notification based on the preset angle and the preset time, which are set based on whether or not the user is crossing a roadway.

* * * * *